US009473716B2

(12) United States Patent
Cheng et al.

(10) Patent No.: US 9,473,716 B2
(45) Date of Patent: Oct. 18, 2016

(54) IMAGE PROCESSING METHOD AND IMAGE PROCESSING DEVICE

(71) Applicant: ASUSTeK COMPUTER INC., Taipei (TW)

(72) Inventors: Yi-Chi Cheng, Taipei (TW); Hendrik Hendrik, Taipei (TW); Wei-Po Lin, Taipei (TW); Hsiu-Jui Kuo, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 125 days.

(21) Appl. No.: 14/572,561

(22) Filed: Dec. 16, 2014

(65) Prior Publication Data

US 2015/0172613 A1 Jun. 18, 2015

(30) Foreign Application Priority Data

Dec. 16, 2013 (TW) .............. 102146402 A

(51) Int. Cl.
| | |
|---|---|
| *H04N 5/235* | (2006.01) |
| *H04N 5/228* | (2006.01) |
| *H04N 5/238* | (2006.01) |
| *G03B 7/00* | (2014.01) |
| *H04N 5/357* | (2011.01) |
| *H04N 1/387* | (2006.01) |
| *G06T 5/00* | (2006.01) |
| *G06T 5/50* | (2006.01) |
| *H04N 5/232* | (2006.01) |

(52) U.S. Cl.
CPC .............. *H04N 5/357* (2013.01); *G06T 5/009* (2013.01); *G06T 5/50* (2013.01); *H04N 1/3871* (2013.01); *H04N 5/2355* (2013.01); *H04N 5/23232* (2013.01); *G06T 2207/20221* (2013.01)

(58) Field of Classification Search
CPC ...... H04N 5/235; H04N 5/243; H04N 5/355; G03B 7/00; G03B 2207/00; G01N 2021/8825
USPC ................ 348/221.1, 222.1, 229.1, 362, 365
See application file for complete search history.

(56) References Cited

U.S. PATENT DOCUMENTS

| 8,306,349 | B2 | 11/2012 | Liu | |
|---|---|---|---|---|
| 8,508,632 | B2 | 8/2013 | Li et al. | |
| 2005/0068427 | A1* | 3/2005 | Sudo | ...................... A61B 1/045 348/222.1 |
| 2005/0265626 | A1* | 12/2005 | Endo | .................. G06K 9/00228 382/274 |

(Continued)

FOREIGN PATENT DOCUMENTS

| CN | 101841631 B | 9/2011 |
|---|---|---|
| TW | 201216697 A1 | 4/2012 |

*Primary Examiner* — Chia-Wei A Chen
(74) *Attorney, Agent, or Firm* — Muncy, Geissler, Olds & Lowe, P.C.

(57) ABSTRACT

An image processing device includes a camera unit, a control unit, an image processing unit and a storage unit. The camera unit obtains a first image. The control unit coupled to the camera unit adjusts an exposure value of the camera unit to control an average luminance value of the dark part of the first image and a contrast value of the first image. The storage unit is coupled to the control unit. The image processing unit is coupled to the camera unit and the storage unit, and it generates a second image according to the first image and a first algorithm stored in the storage unit, and generates a third image according to the first image and a second algorithm stored in the storage unit. The image processing unit generates a fourth image according to luminance values of the first image, the second image and the third image.

10 Claims, 3 Drawing Sheets

(56) References Cited

U.S. PATENT DOCUMENTS

| | | | |
|---|---|---|---|
| 2007/0189625 A1* | 8/2007 | Battiato | H04N 19/172 382/250 |
| 2007/0216777 A1* | 9/2007 | Quan | G06K 9/34 348/222.1 |
| 2009/0060328 A1* | 3/2009 | Manabe | H04N 5/57 382/168 |
| 2009/0175511 A1* | 7/2009 | Lee | G06K 9/00221 382/118 |
| 2011/0293259 A1* | 12/2011 | Doepke | G03B 7/08 396/236 |
| 2012/0307107 A1* | 12/2012 | Brunner | H04N 5/2351 348/229.1 |
| 2012/0312960 A1* | 12/2012 | Mine | H04N 5/347 250/206 |

* cited by examiner

IMAGE PROCESSING METHOD AND IMAGE PROCESSING DEVICE

CROSS-REFERENCE TO RELATED APPLICATION

This application claims the priority benefit of TW application serial No. 102146402, filed on Dec. 16, 2013. The entirety of the above-mentioned patent applications are hereby incorporated by reference herein and made a part of specification.

BACKGROUND OF THE INVENTION

1. Field of the Invention

The invention relates to an image processing method and an image processing device and, more particularly, to an image processing method and an image processing device for obtaining a simulating high dynamic image.

2. Description of the Related Art

Recent years, photographing has become one of the main interests for the users. A notebook computer, a tablet computer and a mobile phone are almost equipped with a camera. People gradually have better equipment on photographing and video communication anywhere and anytime. However, if the surrounding environment is not suitable to take pictures, such as under insufficient light, backlight or in a high contrast (both a very high brightness and a very low brightness exit in the environment at the same time), the expression of captured images is poor due to limited capability of the camera and cannot present its original appearance.

Conventionally, the high dynamic range (HDR) technology has wider exposure dynamic range than that of a digital image technology, it photographs with different exposure values to generate multiple images, and fuses the multiple images with different exposure values to output an optimized image. However, multiple images take up more memory space, and the high dynamic range image needs multiple exposure values, consequently, the speed of the image processing is decreased. Furthermore, to perform the high dynamic range, images have to be taken at the same position under different exposure values at different time points. However, for a better performance, the camera must cooperate with a monopod or other fixing units to ensure every take is identically the same, otherwise, the captured images are easily different due to minor shift, and then the fused image may have a ghost image or results an incomplete image.

BRIEF SUMMARY OF THE INVENTION

An image processing method applied to an image processing device is provided. The image processing device includes a camera unit, a control unit, an image processing unit and a storage unit. The image processing method comprises following steps: obtaining a first image by the camera unit, and the control unit adjusts an exposure value of the camera unit to control an average luminance value (the average Y value of YUV color space) of the dark part of the first image and a contrast value of the first image; generating a second image by the image processing unit according to the first image and a first algorithm, and the first algorithm is stored in the storage unit; generating a third image by the image processing unit according to the first image and a second algorithm, and the second algorithm is stored in the storage unit; and generating a fourth image by the image processing unit according to the luminance value of the first image, the luminance value of the second image, the luminance value of the third image and a weight array.

An image processing device including a camera unit, a control unit, an image processing unit and a storage unit is provided. The camera unit obtains a first image. The control unit is coupled to the camera unit, and it adjusts an exposure value of the camera unit to control an average Y value of YUV color space of the dark part of the first image and a contrast value of the first image. The storage unit is coupled to the control unit. The image processing unit is coupled to the camera unit and the storage unit, and the image processing unit generates a second image according to the first image and a first algorithm, and the first algorithm is stored in the storage unit, and the image processing unit generates a third image according to the first image and a second algorithm, and the second algorithm is stored in the storage unit. The image processing unit generates a fourth image according to a luminance value of the first image, the luminance value of the second image, the luminance value of the third image and a weight array.

Therefore, executing the image processing method to one captured original image results a simulating high dynamic range image in real time, which saves memory space and avoids incomplete images due to combine multiple different images.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

An image processing method and an image processing device are illustrated with relating figures, and the same symbols denote the same components.

Figure 1:
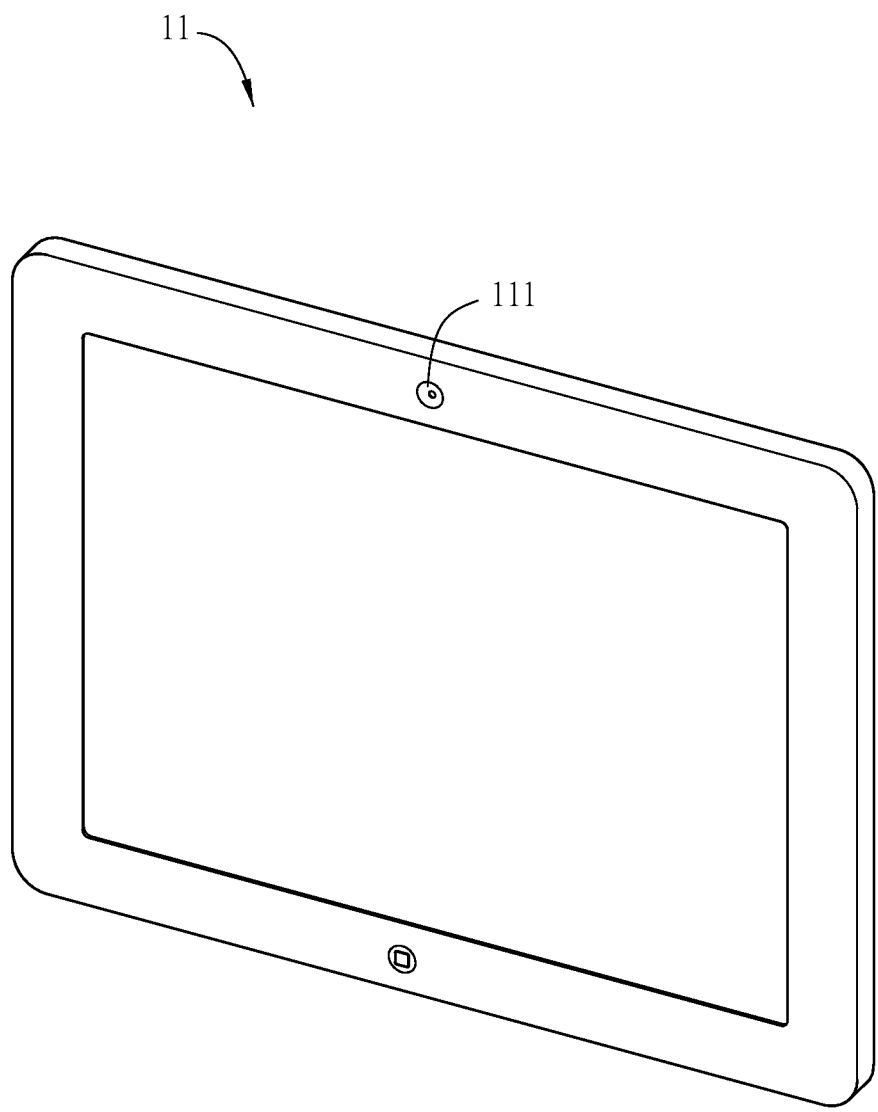
FIG. 1 is a schematic diagram showing the appearance of an image processing device in an embodiment.

FIG. 1 is a schematic diagram showing the appearance of an image processing device in an embodiment. Please refer to FIG. 1, in the embodiment, the image processing device 11 is a tablet computer which cooperates with a camera unit 111, which is not limited herein. In other embodiments, the image processing device may be portable electronic device such as a notebook computer, a smartphone, a multimedia device, a portable video game or another portable electronic device cooperated with a camera lens, which is not limited herein. Furthermore, the image processing device also may be an electronic device or a system which is fixedly disposed, such as a monitor device and a security camera system.

Figure 2:
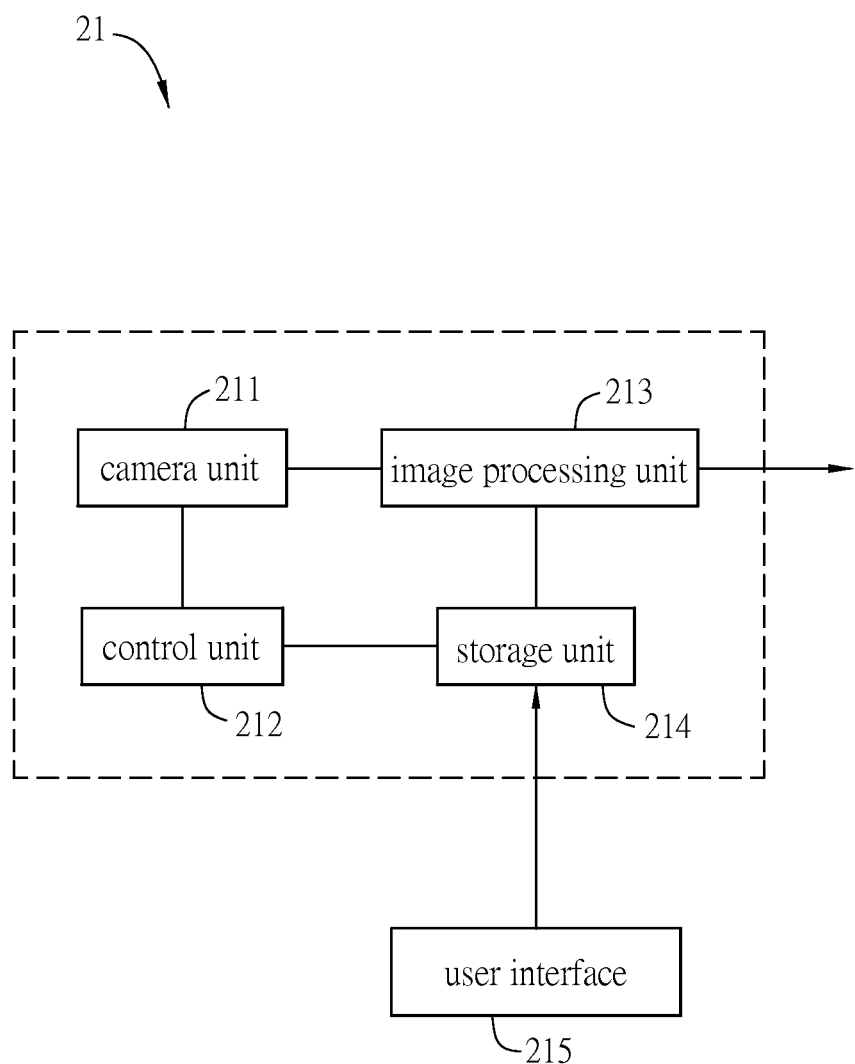
FIG. 2 is a schematic diagram showing the internal structure of an image processing device in an embodiment.

Please refer to FIG. 2, FIG. 2 is a schematic diagram showing the internal structure of an image processing device in an embodiment. The image processing device 21 includes a camera unit 211, a control unit 212, an image processing unit 213 and a storage unit 214. The camera unit 211 obtains a first image according to an operation. The control unit 212 is coupled to the camera unit 211, for adjusting an exposure value of the camera unit 211, so as to control an average luminance value (an average Y value of YUV color space) of the dark part of the first image and a contrast value of the first image.

In detail, the control unit 212 controls the exposure value of the camera unit to make the average Y value of YUV color space of the dark part of the first image obtained by the camera unit 211 between 30 and 40 nit, and the contrast value of the first image is between 80% and 90% of the contrast value that built in the camera unit 211. The first image generated via the above parameters facilitates the subsequent image processing.

The image processing unit 213 is coupled to the camera unit 211, and the storage unit 214 is coupled to the control unit 212 and the image processing unit 213. The image processing unit 213 generates a second image according to the first image obtained by the camera unit 211 and a first algorithm stored in the storage unit 214, and it generates a third image according to the first image and a second algorithm, and the second algorithm is stored in the storage unit 214. Further, the image processing unit 213 generates a fourth image according to the luminance value of the first image, the luminance value of the second image, the luminance value of the third image and a weight array. In the embodiment, the image processing unit 213 increases the luminance of all pixels of the first image according to the first algorithm stored in the storage unit 214 to generate the second image, and the image processing unit 213 increases the contrast ratio of the first image according to the second algorithm stored in the storage unit 214, especially increases the contrast ratio of local pixels to generate the third image.

In the embodiment, the control unit 212 and the image processing unit 213 are two independent components, however, in other embodiments, the control unit 212 and the image processing unit 213 is an integrated component, which is not limited herein.

In addition, in the embodiment, the weight array is a default weight array stored in the storage unit 214. The weight array can be a group of numerical value stored in the storage unit 214, for example, the numerical value is [⅓, ⅓, ⅓]. The number of the weight array stored in the storage unit 214 can be determined according to the demands of the product and the images processing. When multiple groups of weight arrays are stored in the storage unit 214, the image processing unit 213 can choose a different weight array according to a different photo mode. For example, the image processing device 21 further includes a user operation interface 215, which provides multiple shooting modes for users, such as a night mode, a fireworks mode, an outdoor sunlight mode or an outdoor artificial lighting mode, which is not limited herein. Accordingly, the storage unit 214 has different weight arrays corresponding to the shooting modes. When one of the shooting modes is chosen, the image processing unit 213 chooses a corresponding weight array from the storage unit 214. In addition, the image processing device 21 further includes a sensing unit (not shown), it senses the condition of the external environment, such as the luminance of the foreground and the background, and provides the sensed result to the image processing unit 213, and then the image processing unit 213 chooses a group of weight array according to the sensed result. Additionally, in other embodiment, the weight array is input by users via a user operation interface 215, thus to flexibly adjust the effect of the image according to the demands and preferences of the users.

Figure 3:
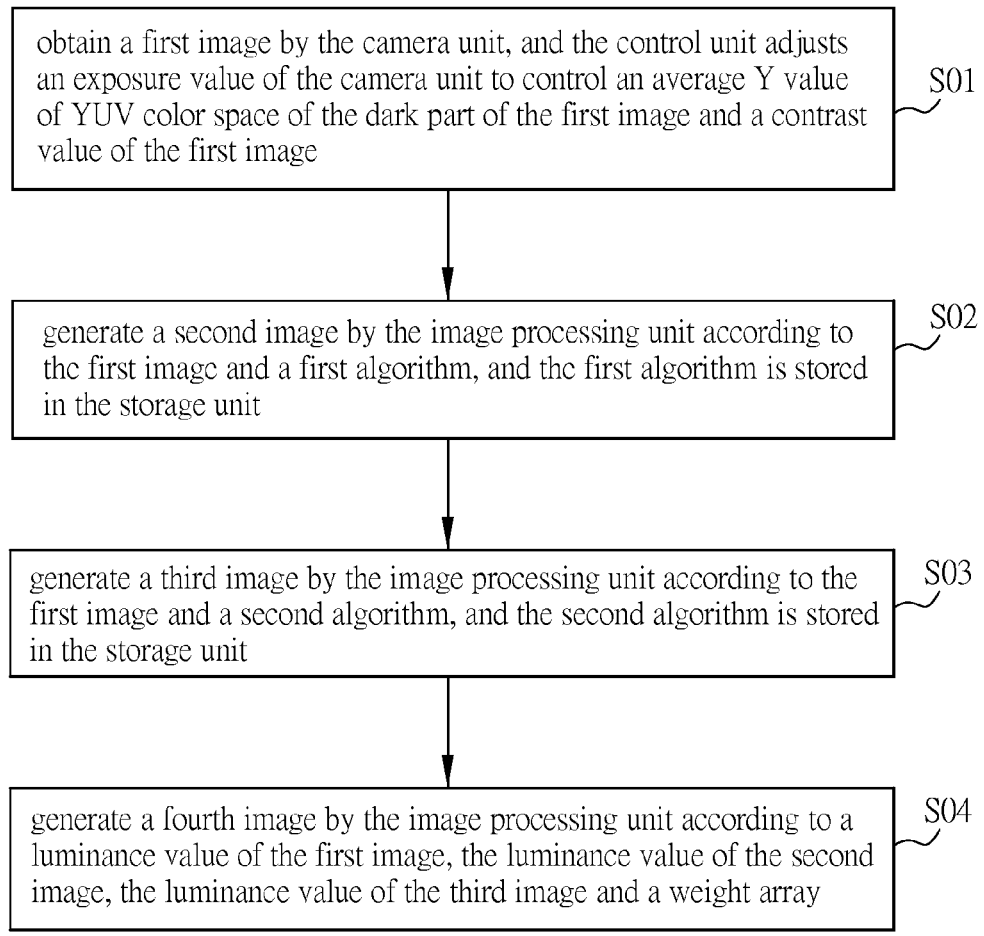
FIG. 3 is a flow chart showing an image processing method in an embodiment.

Please refer to FIG. 3 and FIG. 2, FIG. 3 is a flow chart showing an image processing method applied to the image processing device 21. The image processing method includes step S01 to step S04. In step S01, a first image is obtained by the camera unit 211, and the control unit 212 adjusts the exposure value of the camera unit 211 to control the average Y value of YUV color space of the dark part of the first image and the contrast value of the first image.

In detail, the control unit 212 controls the exposure value of the camera unit 211 to make the average Y value of YUV color space of the dark part of the first image between 30 and 40 nit, and make the contrast value of the first image between 80% and 90% of the contrast value built in the camera unit 211. In the embodiment, the control unit 212 controls photo parameters of the camera unit 211 to generate the first image, which facilitates the subsequent image processing.

In step S02, the image processing unit 213 generates a second image according to the first image and a first algorithm stored in the storage unit 214. In the embodiment, after the camera unit 211 obtains a preferable first image, the first image is temporarily stored in the storage unit 214, and the image processing unit 213 processes the first image via the first algorithm. The image processing unit 213 increases the luminance of all pixels of the first image according to the first algorithm to generate the second image. In the embodiment, the image processing unit 213 adjusts the luminance in different proportions according to the original luminance value of all pixels of the first image. For example, if the original luminance value of the pixel is equal to or less than a default value, the luminance is adjusted by a high proportion, if the original luminance value of the pixel is larger than the default value, the luminance is adjusted by a low proportion. Moreover, in an embodiment, the first algorithm includes multiple functions which can be chosen according to requirements for processing the original luminance value of all pixels of the first image, so as to improve the luminance of all pixels. In the embodiment, the first algorithm is a wide dynamic range (WDR) algorithm, and the second image generated by the processing of the image processing unit 213 is temporarily stored in the storage unit 214.

In step S03, the image processing unit 213 generates a third image according to the first image and a second algorithm, and the second algorithm is stored in the storage unit 214. In the embodiment, the image processing unit 213 processes the first image via the second algorithm to improve the contrast ratio of the first image, especially, increases the local contrast ratio of the first image, and generates the third image. The image processing unit 213 analysis the luminance of the foreground and the background, and adjusts the ratio therebetween. In an embodiment, the second algorithm is a contrast-limited adaptive histogram equalization (CLAHE) algorithm, the third image generated by the processing of the image processing unit 213 is temporarily stored in the storage unit 214. At the time, the storage unit 214 stores the first image, the second image and the third image.

In step S04, the image processing unit 213 generates a fourth image according to the luminance value of the first image, the luminance value of the second image, the luminance value of the third image and a weight array. In the embodiment, the image processing unit 213 extracts the first image, the second image and the third image from the storage unit 214, and executes the weight calculation at the luminance values of the first image, the second image and the third image according to the weight array stored in the storage unit 214, to obtain the fourth image. For example, if the weight array stored in the storage unit 214 is [⅓, ⅓, ⅓], and the luminance value of the first image is 40, the luminance value of the second image is 100 and the luminance value of the third image is 80, after the calculation via the weight array, the luminance value of the fourth image is 70 nit (that is, 40×⅓+100×⅓+80×⅓=70). The above values and calculation modes are calculated on the corresponding pixels of the first image, the second image and the third image. The fourth image is generated via the weight calculation of all pixels of all images, and the fourth image is a simulating high dynamic range image generated by the image processing method in the embodiment. The fourth image is then outputted to a display unit (not shown) via the image processing unit 213 for users to confirm. In other embodiments, the weight array is inputted via the user operation interface 215.

Moreover, the fourth image generated after the weight calculation also can have other fine adjustment, such as softening, sharpening, or other image processing methods, to perfect the final image and then output to the display unit. The image adjustment or the parameters adjustment can have different extra processing according to the use requirements, which is not limited herein.

In the above steps, the executing sequence of step S02 and step S03 is adjustable based on user requirements. In other words, step S02 can be executed before step S03, or step S03 can be executed before step S02, or step S02 and step S03 are executed simultaneously. In order to accelerate the speed of the image processing, in the embodiment, step S02 and step S03 are executed simultaneously.

In sum, according to the image processing method and the image processing device described in the embodiments above, the camera unit obtains the first image, and the control unit adjusts the exposure value of the camera unit to control the average Y value of YUV color space of the dark part on the first image and the contrast value of the first image. Therefore, executing the image processing method to captured one original image results a simulating high dynamic range image in real time, which saves memory space and avoids incomplete images due to combine multiple different images.

Although the invention has been disclosed with reference to certain preferred embodiments thereof, the disclosure is not for limiting the scope. Persons having ordinary skill in the art may make various modifications and changes without departing from the scope of the invention. Therefore, the scope of the appended claims should not be limited to the description of the preferred embodiments described above.

What is claimed is:

1. An image processing method, applied to an image processing device including a camera unit, a control unit, an image processing unit and a storage unit, the image processing method comprising steps of:
    obtaining a first image by the camera unit, wherein the control unit adjusts an exposure value of the camera unit to control an average Y value of YUV color space of a dark part of the first image and a contrast value of the first image;
    generating a second image by the image processing unit according to the first image and a first algorithm, wherein the first algorithm is stored in the storage unit;
    generating a third image by the image processing unit according to the first image and a second algorithm, wherein the second algorithm is stored in the storage unit; and
    generating a fourth image by the image processing unit according to a luminance value of the first image, the luminance value of the second image, the luminance value of the third image and a weight array.

2. The image processing method according to claim 1, wherein the control unit adjusts the average Y value of YUV color space of the dark part of the first image between 30 nit and 40 nit, and make the contrast value of the first image between 80% and 90% of the contrast value built in the camera unit.

3. The image processing method according to claim 1, wherein the image processing unit increases a luminance of all pixels of the first image according to the first algorithm to generate the second image.

4. The image processing method according to claim 1, wherein the image processing unit increases a local contrast ratio of the first image according to the second algorithm to generate the third image.

5. The image processing method according to claim 1, wherein the weight array is a default weight array stored in the storage unit.

6. The image processing method according to claim 1, wherein the weight array is a weight array input from external.

7. The image processing method according to claim 1, wherein the method further includes the following step:
    softening the fourth image.

8. The image processing method according to claim 1, the method further includes the following step:
    sharpening the fourth image.

9. An image processing device, comprising:
    a camera unit obtaining a first image;
    a control unit coupled to the camera unit, wherein the control unit adjusts an exposure value of the camera unit to control an average Y value of YUV color space of a dark part of the first image and a contrast value of the first image;
    a storage unit coupled to the control unit; and
    an image processing unit coupled to the camera unit and the storage unit, wherein the image processing unit generates a second image according to the first image and a first algorithm, the first algorithm is stored in the storage unit, and the image processing unit generates a third image according to the first image and a second algorithm, and the second algorithm is stored in the storage unit;
    wherein the image processing unit generates a fourth image according to a luminance value of the first image, the luminance value of the second image, and the luminance value of the third image and a weight array.

10. The image processing device according to claim 9, wherein the control unit adjusts the exposure value of the camera unit to make the average Y value of YUV color space of the dark part of the first image between 30 nit and 40 nit, and make the contrast value of the first image between 80% and 90% of the contrast value built in the camera unit.

* * * * *